United States Patent Office 3,703,510
Patented Nov. 21, 1972

3,703,510
1-CARBOXYALKYL OR 1-CARBOXYALKENYL-1,4-BENZODIAZEPIN-2-ONES
James Valentine Earley, 40 Daniel Drive, Cedar Grove, N.J. 07009; Rodney Ian Fryer, 5 Eton Drive, North Caldwell, N.J. 07006; and Leo Henryk Sternbach, 10 Woodmont Road, Upper Montclair, N.J. 07043
No Drawing. Continuation-in-part of application Ser. No. 836,226, June 23, 1969. This application June 1, 1970, Ser. No. 42,532
Int. Cl. C07d 53/06
U.S. Cl. 260—239.3 D                          18 Claims

ABSTRACT OF THE DISCLOSURE 1-carboxyalkyl or 1-carboxyalkenyl-1,4-benzodiazepin-2-ones are disclosed. These benzodiazepine derivatives and their pharmaceutically acceptable salts are useful as anticonvulsants, sedatives and muscle relaxants. These compounds, particularly their basic salts, form stable aqueous solutions and thus are especially advantageous in that they are amenable to formulations suitable for injection.

RELATED APPLICATIONS

This application is a continuation-in-part of application Ser. No. 836,226, filed June 23, 1969 now abandoned.

BRIEF DESCRIPTION OF THE INVENTION

The present invention relates to 1-carboxyalkyl or 1-carboxyalkenyl 1,4-benzodiazepin-2-ones selected from the group consisting of a compound of the formula

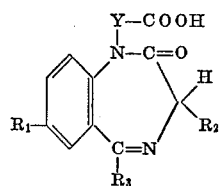

a compound of the formula

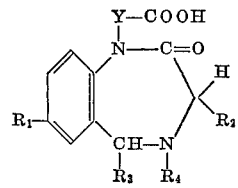

wherein Y represents an alkyl or alkenyl group in the 1-position having from 2 to 10 carbon atoms; $R_1$ is selected from the group consisting of hydrogen, halogen, trifluoromethyl, nitro, lower alkyl and amino; $R_2$ is selected from the group consisting of hydrogen, lower alkyl, hydroxy and lower alkanoyloxy; $R_3$ is selected from the group consisting of phenyl, phenyl substituted with halogen, trifluoromethyl, nitro, lower alkyl or amino, and pyridyl; and $R_4$ is selected from the group consisting of hydrogen and lower alkyl and the pharmaceutically acceptable salts thereof.

In a preferred aspect of the present invention Y is an alkyl group having from 2 to 6 carbon atoms, $R_1$ is nitro or halogen, most preferably chloro, iodo or bromo, $R_2$ is hydrogen and $R_3$ is phenyl, phenyl substituted with halogen, most preferably chloro or fluoro, or pyridyl. In the case where $R_3$ is phenyl substituted with halogen, it is most desirable that the halogen be substituted at the ortho or 2′-position. When $R_3$ is pyridyl, it is preferred that the pyridyl grouup be bonded to the benzodiazepine nucleus through the 2-position of the pyridyl ring. In still another preferred aspect, Y is an alkenyl group having from 2–6 carbon atoms.

The term "halogen" as used herein is meant to denote all four forms thereof, i.e., chlorine, fluorine, bromine and iodine unless otherwise specified. "Lower alkyl" includes straight and branched chain hydrocarbon groups having from 1 to 7, preferably 1 to 4, carbon atoms including, for example, methyl, ethyl, propyl, isopropyl, butyl and the like. A representative lower alkanoyloxy group is an acetoxy group. The term "alkyl" includes straight and branched chain saturated hydrocarbon groups having from 2 to 10, preferably 2 to 6 carbon atoms. Likewise, the term "alkenyl" includes straight and branched chain olefinic unsaturated hydrocarbon groups having from 2 to 10, preferably from 2 to 6 carbon atoms.

The compounds of Formulae Ia and Ib form pharmaceutically acceptable acid addition salts with pharmaceutically acceptable organic and inorganic acids such as hydrochloric acid, hydrobromic acid, sulfonic acid, p-toluene sulfonic acid, phosphoric acid, nitric acid, tartaric acid, citric acid, camphorsulfonic acid, ethanesulfonic acid, ascorbic acid, salicylic acid, maleic acid and the like. In addition, these compounds in the form of the pharmaceutically unacceptable acid addition salts may be converted to the desired pharmaceutically acceptable acid addition salt form by treatment of the pharmaceutically unacceptable acid addition salt with a pharmaceutically acceptable acid under ion exchange conditions. An alternative method for effecting substitution of the acid salt forms is to convert the pharmaceutically unacceptable acid salt form to the free base followed by formation of the desired pharmaceutically acceptable acid form therefrom by means known in the art.

In a further aspect of the present invention there is encompassed within the scope of Formulae Ia and Ib the basic salts of the carboxylic acid group. Such salts are formed by exchanging the hydrogen ion of the carboxyl group with a cation such as an alkali or alkaline earth metal cation, e.g., sodium ion, potassium ion, calcium ion, etc. or a complex cation such as an ammonium ion or a substituted ammonium ion such as a mono-, di- or trialkylammonium ion or a mono-, di or trihydroxyalkylammonium ion. Base salt forms of the compounds of Formulae Ia and Ib are prepared from the free acid by treating said acid with a desired base compound using techniques now well known in the art. Examples of preferred base compounds for this purpose include sodium hydroxide, sodium carbonate, ethylenediamine, diethanolamine, triethanolamine or tris-(hydroxymethyl)aminomethane.

The resulting salt solutions will range in pH slightly on the alkaline side depending on the concentrations desired. The base compound content is usually one mole equivalent with the exception of the weaker bases such as tris-(hydroxymethyl)-aminomethane which require somewhat more than one mole equivalent. The pH range of these solutions may be from 7 to 10 but generally is from 8 to 9.

The compounds of Formulae Ia and Ib above may be prepared by reacting a compound of the formula

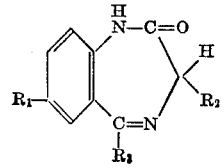

or a compound of the formula

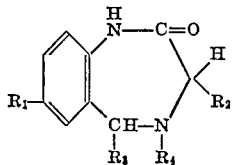
IIb wherein $R_1$–$R_4$ are as described above with a compound of the formula

 III wherein X is selected from the group consisting of chloro, iodo and bromo (bromo is preferred); Z is selected from the group consisting of carboxyl or a group convertible into carboxyl by hydrolysis or oxidation, e.g., lower alkoxycarbonyl, aryloxy-carbonyl, carbonamide, methylene hydroxy, formyl, cyano, carbonyl-methyl, acid anhydride, etc. (preferably Z is carboxyl or carboxy-lower alkyl, most preferably carboxymethyl or carboxy-ethyl); and Y is as described above.

In order to facilitate the reaction between compounds of Formulae IIa or IIb and III above, the compound of Formulae IIa or IIb is initially converted to the 1-sodio derivative. This may most conveniently be accomplished by treating the compound of Formula IIa or IIb with a reactive sodium agent such as sodium hydride. It is the sodium form of the compound of Formula IIa or IIb which reacts with the compounds of Formula III above to produce the compounds of the present invention, e.g compounds of Formula Ia or Ib or immediate precursors thereto.

Conversion of the enumerated functional groups Z into the desired carboxyl group may be accomplished by hydrolytic or oxidative procedures well known in the art. Thus, for example, when compounds of Formula III having Z as a lower alkoxy-carbonyl group are employed in the above reaction, it is necessary to hydrolyze the reaction product to yield the desired compounds of Formula Ia or Ib. Such hydrolysis is readily conducted in the presence of alkali using conventional conditions. The desired free acid is obtained after acidification with an acid, e.g. a mineral acid or organic acid such as hydrochloric acid or acetic acid. Similar procedures can be employed to obtain the desired carboxyl group when Z represents aryloxy-carbonyl or an acid anhydride. In the case that Z signifies a carbonamide group, it can be converted into a carboxyl group by treatment with nitrous acid. For the oxidation of a methylene hydroxy or a formyl group, in cases where Y is lower alkyl, treatment with an organic peracid such as perbenzoic acid, perphthalic acid, etc. will result in the desired carboxyl group. The same result can be achieved if Y is either lower alkyl or lower alkenyl by treating the methylene hydroxy or formyl group with silver oxide or similar agents. A cyano group can be hydrolyzed by treatment with acid such as diluted hydrochloric acid, to yield the corresponding amide which is in turn transformed into the carboxyl derivative as described above. A methyl-carbonyl group can be transformed into a carboxyl group by treatment with a hypohalide, e.g. bromo, chloro or iodo in basic solution followed by alkaline hydrolysis, e.g. with sodium hydroxide.

The reaction between compounds of Formula III and the sodio derivative of Formula IIa or IIb compounds may be carried out in the presence of an inert organic solvent, such as, for example, benzene, toluene, N,N-dimethylformamide, hexamethylphosphoramide, dimethylsulfoxide and the like. The latter three solvents are preferred. The reaction is conducted at a temperature in the range of from —10 to the reflux temperature of the reaction medium, most preferably in the range of from about 40 to 80° C.

Examples of compounds of Formulae Ia and Ib above and which are thus representative of the present invention may be listed as follows:

3-[7-chloro-5-(2-fluorophenyl)-1,3-dihydro-2-oxo-2H-1,4-benzodiazepin-1-yl]propionic acid
7-chloro-5-(2-fluorophenyl)-1,3-dihydro-2-oxo-2H-1,4-benzodiazepin-1-butyric acid
7-chloro-5-(2-fluorophenyl)-2,3-dihydro-2-oxo-1H-1,4-benzodiazepin-1-valeric acid
7-chloro-5-(2-fluorophenyl)-1,3-dihydro-2-oxo-2H-1,4-benzodiazepine-1-decanoic acid
7-nitro-5-phenyl-1,3-dihydro-2-oxo-2H-1,4-benzodiazepine-1-propionic acid
5-(2-chlorophenyl)-7-nitro-1,3-dihydro-2-oxo-2H-1,4-benzodiazepine-1-propionic acid
5-(2-fluorophenyl)-7-nitro-1,3-dihydro-2-oxo-2H-1,4-benzodiazepine-1-propionic acid
7-bromo-5-(2-pyridyl)-2,3-dihydro-2-oxo-1H-1,4-benzodiazepine-1-propionic acid
5-(2-fluorophenyl)-1,3-dihydro-7-iodo-2-oxo-2H-1,4-benzodiazepine-1-butyric acid
5-(2-fluorophenyl)-1,3-dihydro-7-iodo-2-oxo-2H-1,4-benzodiazepine-1-valeric acid
7-chloro-5-(2-fluorophenyl)-1,3,4,5-tetrahydro-2-oxo-2H-1,4-benzodiazepine-1-valeric acid
7-chloro-5-(2-fluorophenyl)-4-methyl-1,3,4,5-tetrahydro-2-oxo-1,4-benzodiazepine-1-valeric acid
7-chloro-2,3-dihydro-α,α-dimethyl-2-oxo-5-phenyl-1H-1,4-benzodiazepine-1-butyric acid
7-chloro-2,3-dihydro-2-oxo-5-phenyl-1H-1,4-benzodiazepin-1-crotonic acid and the pharmaceutically acceptable salts of these compounds.

The compounds of Formulae Ia and Ib and the pharmaceutically acceptable salts thereof are useful as pharmaceuticals and are characterized by activity as anticonvulsant agents, sedatives and muscle relaxants. These compounds can be used in the form of conventional pharmaceutical preparations; for example, the aforesaid compounds can be mixed with conventional organic or inorganic, inert pharmaceutical carriers suitable for parenteral or enteral administration such as, for example, water, gelatin, lactose, starch, magnesium stearate, talc, vegetable oil, gums, polyalkylene glycols, Vaseline or the like. They can be administered in conventional pharmaceutical forms, e.g., solid forms, for example, tablets, dragees, capsules, suppositories or the like; or in liquid forms, for example, injectable solutions, suspensions or emulsions. Moreover, the pharmaceutical compositions containing compounds of this invention can be subjected to conventional pharmaceutical expedients such as sterilization and can contain conventional pharmaceutical excipients such as preservatives, stabilizing agents, wetting agents, emulsifying agents, salts for the adjustment of osmotic pressure or buffers. The compositions can also contain other therapeutically active materials.

A suitable pharmaceutical dosage unit can contain from about 2 to 200 mg. of the aforesaid compounds of Formula Ia or Ib or a corresponding amount of a pharmaceutically acceptable salt thereof. Suitable oral dosage regimens in mammals comprise from about 0.05 mg./kg. per day to about 4 mg./kg. per day. Suitable parenteral dosage regimens in mammals comprise from about 0.05 mg./kg. per day to about 4 mg./kg. per day. However, for any particular subject, the specific dosage regimen should be adjusted according to individual needs and the professional judgment of the person administering or supervising the administration of the aforesaid compound. It is to be understood that the dosages set forth herein are exemplary only and that they do not, to any extent, limit the scope or practice of this invention.

The following examples are illustrative but not limitative of this invention. All temperatures are in degrees centigrade.

EXAMPLE 1

Preparation of 3-[7-chloro-5-(2-fluorophenyl)-1,3-dihydro-2-oxo-2H-1,4-benzodiazepin-1-yl]propionic acid A solution of 20 g. (0.0692 M) of 7-chloro-5-(2-fluorophenyl)-1,3-dihydro-2H-1,4-benzodiazepin-2-one in 100 ml. of dry N,N-dimethylformamide was treated under nitrogen with 8.4 g. (0.206 M) of a 60 percent dispersion of sodium hydride in mineral oil. After 30 minutes, the reaction mixture was cooled in an ice bath and treated with 12.6 g. (0.83 M) of 3-bromopropionic acid. The reaction was heated for 3 hours at 60° and then the solvent was removed under reduced pressure. The residue was dissolved in 150 ml. of dichloromethane and dilute hydrochloric acid. The aqueous layer was made basic with ammonium hydroxide and the layers were separated. The aqueous layer was extracted with dichloromethane, acidified with acetic acid and the product was obtained by filtration. Recrystallization twice from a mixture of methanol and ether gave 11 g. (44 percent) of the above-titled product as pale yellow prisms, M.P. 184–8°.

EXAMPLE 2

Preparation of 7-chloro-5-(2-fluorophenyl)-1,3-dihydro-2-oxo-2H-1,4-benzodiazepine-1-butyric acid A solution of 4.5 g. (0.0103 M) of 7-chloro-5-(2-fluorophenyl) - 1,3 - dihydro - 2-oxo-2H-1,4-benzodiazepine-1-butyric acid ethyl ester hydrochloride in 50 ml. of methanol was treated with 25 ml. of 3 N sodium hydroxide and 75 ml. of water. After 1 hour, the solution was acidified with concentrated hydrochloric acid, made basic with ammonium hydroxide and the methanol was distilled. The solution was washed with dichloromethane (2× 50 ml.), acidified with acetic acid and cooled in an ice bath. The water was decanted and the residue was dissolved in 75 ml. of dichloromethane, which was washed with 75 ml. of water, 50 ml. of saturated brine, dried and evaporated. The product was crystallized from a mixture of methanol, ether and petroleum ether to give 3.4 g. (87 percent) of the above-titled product as white rods, M.P. 173–8°.

The starting material may be prepared as follows:

A solution of 10 g. (0.0346 M) of 7-chloro-5-(2-fluorophenyl)-1,3-dihydro-2H-1,4-benzodiazepin-2-one in 80 ml. of dry N,N-dimethylformamide under nitrogen was treated with 1.7 g. (0.0415 M) of a 57 percent dispersion of sodium hydride in mineral oil. After 30 minutes, δ bromobutyric ethyl ester was added with stirring and allowed to stand for 5 hours at room temperature. Solvent was removed under reduced pressure and the residue was dissolved in 100 ml. of dichloromethane. The solution was washed with 100 ml. of water, 75 ml. of saturated brine, dried over anhydrous sodium sulfate and evaporated to dryness.

The residual oil was dissolved in 50 ml. of benzene and chromatographed over an alumina column (150 g.) using 500 ml. of benzene which was discarded. Elution with 1 l. of ether and 1.5 l. of ethyl acetate gave 11 g. of product, which was crystallized from ethanolic hydrogen chloride and ether. Recrystallization from ethanol and ether gave 9.8 g. (64 percent) of 7-chloro-5-(2-fluorophenyl)-1,3-dihydro-2-oxo-2H-1,4-benzodiazepine-1-butyric acid ethyl ester hydrochloride as pale yellow needles, M.P. 196–8° (sealed tube).

EXAMPLE 3

Preparation of 7–chloro-5-(2-fluorophenyl)-2,3-dihydro-2-oxo-1H-1,4-benzodiazepine-1-valeric acid A solution of 5.0 g. (0.011 M) of 7-chloro-5-(2-fluorophenyl) - 1,3 - dihydro - 2 - oxo-2H-1,4-benzodiazepine-1-valeric acid ethyl ester hydrochloride in 250 ml. of methanol was treated with 25 ml. (0.025 M) of 1 N sodium hydroxide and 100 ml. of water and after 18 hours, the solution was acidified with 3 N hydrochloric acid, made basic with ammonium hydroxide and methanol was removed by distillation. The solution was washed with 125 ml. of dichloromethane, acidified with acetic acid, cooled and decanted from the crude product. The residue was dissolved in 100 ml. of dichloromethane, washed with 100 ml. of water, 75 ml. of saturated brine, dried and evaporated. The oil was converted to the hydrogen sulfate salt of the above-titled compound by adding an equivalent amount of concentrated sulfuric acid to an acetone solution of the product and then adding ether until precipitation occurred. The precipitate was recrystallized from a mixture of acetone and ether to give 3.5 g. (65 percent) of the salt as white prisms, M.P. 205–9°.

The free acid was liberated from the pure salt and was recrystallized from a mixture of dichloromethane, ether and hexane to give the above-titled compound as white prisms, M.P. 115–118°.

The starting material may be prepared as follows:

A solution of 10 g. (0.0346 M) of 7-chloro-5-(2-fluorophenyl)-1,3-dihydro-2H-1,4-benzodiazepin-2-one in 70 ml. of dry N,N-dimethylformamide under nitrogen was treated with 1.7 g. (0.0415 M) of a 57 percent dispersion of sodium hydride in mineral oil. After 30 minutes, the solution was cooled to 10°, 10.8 g. (0.0519 M) of ethyl 5-bromovalerate was added with stirring and the solution was allowed to stir at room temperature for 18 hours. Solvent was removed under reduced pressure. The residue was dissolved in 100 ml. of dichloromethane which was washed with 100 ml. of water, 75 ml. of saturated brine, dried and evaporated to dryness. The oil was converted to the salt by crystallization from ethanolic hydrogen chloride and ether. The salt was recrystallized from a mixture of ethanol and ether to give 7 g. (45 percent) of 7 - chloro - 5 - (2-fluorophenyl)-1,3-dihydro-2-oxo-2H-1,4-benzodiazepine-1-valeric acid ethyl ester hydrochloride as pale yellow prisms, M.P. 137–47° (sealed tube).

EXAMPLE 4

Preparation of 7-chloro-5-(2-fluorophenyl)-1,3-dihydro-2-oxo-2H-1,4-benzodiazepine-1-decanoic acid A solution of 10 g. (0.0346 M) of 7-chloro-5-(2-fluorophenyl)-1,3-dihydro-2H-1,4-benzodiazepin-2-one in 75 ml. of dry N,N-dimethylformamide was treated with 3.8 g. (0.0795 M) of a 50 percent sodium hydride dispersion in mineral oil. The solution was stirred under nitrogen for 1 hour, cooled in an ice bath and treated with 10.8 g. (0.0415 M) of ω-bromodecanoic acid. The mixture was stirred for 18 hours at room temperature, at 50° for 8 hours and at 80° for 2 hours. Solvent was removed under reduced pressure. The residue was dissolved in 100 ml. of dilute ammonium hydroxide, washed with 100 ml. of ether and acidified with acetic acid. After cooling in an ice bath, the water was decanted and the residual oil was dissolved in dichloromethane. This was separated from the remaining water, dried over anhydrous sodium sulfate, treated with charcoal and evaporated to dryness. The residue was dissolved in 50 ml. of benzene and chromatographed over 250 g. of the silica gel using as eluant 2.5 l. of benzene. Evaporation of benzene afforded 3.8 g. of the above-titled product as a non-crystalline oil.

EXAMPLE 5

Preparation of 7-nitro-5-phenyl-1,3-dihydro-2-oxo-2H-1,4-benzodiazepine-1-propionic acid A solution of 10 g. (0.0355 M) of 1,3-dihydro-7-nitro-5-phenyl-2H-1,4-benzodiazepin-2-one in 75 ml. of dry N,N-dimethylformamide under nitrogen was treated with 3.4 g. (0.0816 M) of a 57 percent dispersion of sodium hydride in mineral oil. After 0.5 hour, the solution was cooled to 10° and treated with 6.5 g. (0.042 M) of 3-bromopropionic acid. The mixture was heated to 55° for 5 hours, then solvent was removed under reduced pressure. The residue was treated with 100 ml. of dilute ammonium hydroxide, which was then washed with 100 ml. of dichloromethane. The basic layer was acidified with acetic acid, cooled and the solution was decanted. The residue was dissolved in dichloromethane, which was dried and concentrated to a small volume. The product was obtained by filtration and was recrystallized from methanol to give 3.7 g. (30 percent) of the above-titled compound as white prisms, M.P. 198–206° (sealed tube).

EXAMPLE 6

Preparation of 5-(2-chlorophenyl)-7-nitro-1,3-dihydro-2-oxo-2H-1,4-benzodiazepine-1-propionic acid A solution of 10 g. (0.0317 M) of 5-(2-chlorophenyl)-1,3-dihydro-7-nitro-2H-1,4-benzodiazepin-2-one in 75 ml. of dry N,N-dimethylformamide under nitrogen was treated with 3.05 g. (0.0729 M) of a 57 percent sodium hydride dispersion in mineral oil and after 30 minutes, the mixture was cooled to 10° when 5.8 (0.038 M) of 3-bromopropionic acid was added with stirring. The solution was warmed at 55° for 5 hours. Solvents were removed under reduced pressure and the residue was dissolved in 100 ml. of dichloromethane. The solution was extracted with 100 ml. of dilute ammonium hydroxide. The basic layer was acidified with acetic acid, cooled and the solution decanted from the acid. This was then dissolved in 100 ml. of dichloromethane, which was washed with 100 ml. of water, 75 ml. of saturated brine, dried over anhydrous sodium sulfate and evaporated to dryness. The product was recrystallized twice from methanol to give 1.2 g. (10 percent) of the above-titled product as pale yellow prisms, M.P. 188–191° (sealed tube).

EXAMPLE 7

Preparation of 5-(2-fluorophenyl)-7-nitro,1,3-dihydro-2-oxo-2H-1,4-benzodiazepine-1-propionic acid A solution of 10 g. (0.0333 M) of 1,3-dihydro-5,-(2-fluorophenyl)-7-nitro-2H-1,4-benzodiazepin-2-one in 75 ml. of dry N,N-dimethylformamide under nitrogen was treated with 3.2 g. (0.0765 M) of a 57 percent sodium hydride dispersion in mineral oil. After 30 minutes, the reaction was cooled to 10° and was treated with 6.1 g. (0.0399 M) of 3-bromopropionic acid. The solution was warmed to 45° for 6 hours and then solvent was removed under reduced pressure. The residue was dissolved in a mixture of 100 ml. of dichloromethane and 100 ml. of dilute ammonium hydroxide. The basic layer was separated, acidified with acetic acid, cooled and the water layer was decanted. The precipitate was recrystallized from methanol to give 2.3 g. (19 percent) of the above-titled product as white prisms, M.P. 188–92°.

EXAMPLE 8

Preparation of 7-bromo-5-(2-pyridyl)-2,3-dihydro-2-oxo-1H-1,4-benzodiazepine-1-propionic acid A solution of 10 g. (0.0316 M) of 7-bromo-1,3-dihydro-5-(2-pyridyl)-2H-1,4-benzodiazepin-2-one in 75 ml. of dry N,N-dimethylformamide was treated with 3.1 g. (0.0726 M) of a 57 percent sodium hydride dispersion under nitrogen. After 30 minutes, the solution was cooled to 10° and treated with 5.8 g. (0.0378 M) of 3-bromopropionic acid. The mixture was allowed to stand at room temperature for 5 days. Hydrochloric acid (3 N) was added to pH 9 and solvents were removed under reduced pressure. The residue was dissolved in 300 ml. of dichloromethane and 200 ml. of dilute ammonium hydroxide was added. The layers were separated and the basic layer was acidified with acetic acid. The mixture was cooled and the water was decanted. The residue was dissolved in 100 ml. of dichloromethane, washed with 100 ml. of water, 75 ml. of saturated brine, dried over anhydrous sodium sulfate and evaporated to dryness. The product was crystallized from methanol and was then recrystallized from a mixture of methanol and tetrahydrofuran to give 1.0 g. (8 percent) of the above-titled product as pale yellow rods, M.P. 102–9°.

EXAMPLE 9

Preparation of 5-(2-fluorophenyl-1,3-dihydro-7-iodo-2H-1,4-benzodiazepin-2-one-1-butyric acid A solution of 3.5 g. (66 mmole) of 5-(2-fluorophenyl)-1,3-dihydro-7-iodo-2H,1,4-benzodiazepin-2-one - 1 -butyric acid ethyl ester hydrochloride in 100 ml. of methanol was treated with 13.2 ml. of 1 N sodium hydroxide, heated on a steambath for 1 hr. and then diluted with 100 ml. of water. The methanol was removed in vacuo and the product precipitated by the addition of acetic acid. The precipitate was collected and crystallized from benzene to give 1.7 g. (55%) of 5-(2-fluorophenyl)-1,3-dihydro-7-iodo-2H-1,4-benzodiazepin-2-one-1-butyric acid, M.P. 190–192°. Recrystallization from chloroform/hexane gave colorless prisms, M.P. 190–192°.

The starting material may be prepared as follows:

A solution of 10.75 g. (50 mmole) of 2-amino-2'-fluorobenzophenone in 100 ml. of glacial acetic acid was heated to 80°, and a solution of 8.2 g. (50 mmole) of iodine monochloride in 25 ml. of acetic acid was added. This mixture was allowed to stand at room temperature for 2 days and then poured onto ice. The product was extracted with methylene chloride, and the methylene chloride solution washed with sodium bicarbonate solution until neutral. The residue left on concentration of the dry (sodium sulfate) methylene chloride solution was crystallized from ethanol to give 4.8 g. (28%), M.P. 90–102° of crude 2-amino-2'-fluoro-5-iodobenzophenone. Recrystallization from hexane and then ethanol/water gave orange needles, M.P. 102–105°.

A mixture of 32.1 g. (94.3 mmole) of 2-amino-2'-fluoro-5-iodo-benzophenone, 40.2 g. (17.6 ml., 0.2 mole) of bromoacetyl bromide and 500 ml. of benzene was heated under reflux for 2 hours, cooled, neutralized with dilute ammonium hydroxide, and diluted with methylene chloride. The organic phase was separated, washed with water, dried over sodium sulfate and concentrated in vacuo to ca. 200 ml. Addition of petroleum ether precipitated 30 g. of 2-bromo-2'-(2-fluorobenzoyl)-4'-iodoacetanilide, M.P. 148–151°. Recrystallization from ethanol gave off-white needles, M.P. 150–151°.

A mixture of 27 g. (58.5 mmole) of 2-bromo-2'-(2-fluorobenzoyl)-4'-iodoacetanilide and 750 ml. of anhydrous ammonia was stirred under a Dry Ice condenser for 5 hours and then the ammonia was allowed to evaporate overnight. A suspension of the residue in 1.2 l. of pyridine was stirred and heated under reflux for 2 hours. The solvent was evaporated in vacuo and the residue partitioned between methylene chloride and water. The organic phase was dried over sodium sulfate and concentrated in vacuo. Crystallization of the residue from ether gave 17.2 g. (77%) of 5-(2-fluorophenyl)-1,3-dihydro-7-iodo-2H-1,4-benzodiazepin-2-one, M.P. 221–223°. Recrystallization from ethanol gave white needles, M.P. 222–224°.

To a solution of 7.6 g. (20 mmole) of 5-(2-fluorophenyl)-1,3-dihydro-7-iodo-2H-1,4-benzodiazepin-2-one in 250 ml. of dry tetrahydrofuran was added 3.3 g. (30 mmole) of potassium t-butoxide and 8 g. (40 mmole) of ethyl 4-bromobutyrate. The mixture was stirred overnight at room temperature (24 hours), filtered through Celite and concentrated in vacuo. The residue was dissolved in ether and filtered through 40 g. of alumina. The first 150 ml. of eluate were collected. The residue left on removal of the solvent in vacuo were dissolved in ether and treated with 5 ml. of 10 N ethanolic hydrogen chloride to give 5.6 g. (50%) of 5-(2-fluorophenyl)-1,3-dihydro-7-iodo-2H-1,4-benzodiazepin-2-one-1-butyric acid ethyl ester hydrochloride, M.P. 183–187°. Recrystallization from ethanol/ether gave yellow prisms, M.P. 187–189°.

EXAMPLE 10

Preparation of 5-(2-fluorophenyl)-1,3-dihydro-7-iodo-2H-1,4-benzodiazepin-2-one-1-valeric acid A solution of 5.4 g. (10 mmole) of 5-(2-fluorophenyl)-1,3 - dihydro-7-iodo-2H-1,4-benzodiazepin-2-one-1-valeric acid ethyl ester hydrochloride in 100 ml. of methanol was treated with 20 ml. of 1 N sodium hydroxide, heated on a steambath for 1 hour, and then diluted with 100 ml. of water. The methanol was removed on a rotary evaporator. The cloudy solution was then filtered through Celite and the product precipitated by the addition of acetic acid to give 4.2 g. of crude 5-(2-fluorophenyl)-1,3-dihydro-7-iodo-2H-1,4-benzodiazepin-2-one-1-valeric acid.

The starting material may be prepared as follows:

To a solution of 22.8 g. (60 mmole) of 5-(2-fluorophenyl)-1,3-dihydro-7-iodo-2H-1,4-benzodiazepin-2-one, in 300 ml. of dry tetrahydrofuran was added 10.1 g. (90 mmole) of potassium t-butoxide and 25 g. (120 mmole) of ethyl 5-bromovalerate. The mixture was heated under reflux for 5 hours, cooled, filtered through Celite to remove inorganic material and concentrated in vacuo. The residue was dissolved in ether and the product precipitated by bubbling in hydrogen chloride to give 17.6 g. (53 percent) of crude 5 - (2-fluorophenyl)-1,3-dihydro-7-iodo-2H-1,4-benzodiazepin-2-one-1-valeric acid ethyl ester hydrochloride, M.P. 80–90°. Recrystallization from ethanol/ether gave yellow prisms, M.P. 119–122°.

EXAMPLE 11

Preparation of methyl 7-chloro-2,3-dihydro-α,α-dimethyl-2-oxo-5-phenyl-1H-1,4-benzodiazepine-1-butyrate A solution of 10 g. (0.037 M) of 7-chloro-1,3-dihydro-5-phenyl-2H-1,4-benzodiazepin-2-one in 125 ml. N,N-dimethylformamide was treated at room temperature under nitrogen with 2.15 g. (0.045 M) of a 50% suspension of sodium hydride in mineral oil. After 30 minutes, the solution was cooled to 0°, treated with 11.1 g. (0.053 M) of 4-bromo-2,2-dimethylbutyric acid-methyl ester in 30 ml. of N,N-dimethylformamide and heated to 50° for 15 hours. The solvents were removed under reduced pressure, the residue was dissolved in methylene chloride and water, and the organic phase was separated and washed with a solution of sodium chloride, dried over anhydrous sodium sulfate and evaporated. The resulting oil was chromatographed with 200 g. of aluminum oxide (neutral)/benzene. The homogenous fractions were recrystallized from methanol to yield the above-named product M.P. 130–132°.

EXAMPLE 12

Preparation of 7-chloro-2,3-dihydro-α,α-dimethyl-2-oxo-5-phenyl-1H-1,4-benzodiazepine-1-butyric acid A stirred suspension of 6.0 g. (0.015 M) of 7-chloro-2,3 - dihydro - α,α-dimethyl-2-oxo-5-phenyl-1H-1,4-benzodiazepine-1-butyric acid-methyl ester, in 30 ml. of ethanol was treated with 30 ml. of 1 N sodium hydride and heated for one hour at reflux, to yield a clear yellow solution. The ethanol is evaporated in vacuo, the resulting solution washed with water, rinsed with ethyl acetate and acidified with acetic acid to pH 5–6. The precipitate is filtered by suction, washed with water and dried under pressure at 80°/10 mm. to yield 5.5 g. of crude product, M.P. about 150°. Crystallization from isopropylether yields a light yellow crystal powder which melts at about 120° (vaporizes); the isopropylether is removed, the product is quenched in 2 N HCl and washed with a sodium acetate solution. Purification of 80°/10 mm. yields the above-named product M.P. 176–178°.

EXAMPLE 13

Preparation of 7-chloro-5-(2-fluorophenyl)-1,3,4,5-tetrahydro-2-oxo-2H-1,4-benzodiazepine-1-valeric acid ethyl ester hydrochloride A solution of 15 g. (0.0515 M) of 7-chloro-4,5-dihydro-5-(2-fluorophenyl) - 3H - 1,4 - benzodiazepin-2(1H)-one in 50 ml. of N,N-dimethylformamide was treated with 2.7 g. (0.0567 M) of 50 percent sodium hydride in mineral oil under nitrogen. The mixture was cooled in an ice bath and 11.8 g. (0.0567 M) of ethyl 5-bromovalerate was added dropwise with stirring. After 68 hours at room temperature, the solution was evaporated to dryness. The residue was dissolved in 100 ml. of dichloromethane, washed with 50 ml. of a saturated brine solution, dried over anhydrous sodium sulfate, and evaporated to dryness.

The residue was dissolved in 50 ml. of ethanol and a 10 percent excess of a solution of hydrogen chloride in ethanol was added. The solution was evaporated to dryness and the salt was recrystallized from a mixture of ethanol and ether to give the product as white rods, melting at 162–164° (sealed tube).

EXAMPLE 14

Preparation of 7-chloro-5-(2-fluorophenyl)-1,3,4,5-tetrahydro-2-oxo-2H-1,4-benzodiazepine-1-valeric acid Method A.—A solution of 7 g. (0.0154 M) of 7-chloro-5-(2-fluorophenyl) - 1,3,4,5 - tetrahydro - 2 - oxo-2H-1,4-benzodiazepine-1-valeric acid ethyl ester hydrochloride in 100 ml. of methanol was treated with 46.6 ml. (0.0466 M) of 1 N sodium hydroxide, and then 140 ml. of water was added with stirring. After 18 hours at room temperature, the mixture was acidified with 3 N hydrochloric acid, made basic with ammonium hydroxide and methanol was removed under vacuum. The solution was extracted with 100 ml. of dichloromethane, and the water layer was acidified with acetic acid. The supernatant liquid was decanted. The residual oil was dissolved in 75 ml. of dichloromethane and washed with 50 ml. of a saturated brine solution, dried over anhydrous sodium sulfate and evaporated to dryness. The residue was recrystallized from methanol to give 7-chloro-5-(2-fluorophenyl)-1,3,4,5-tetrahydro-2-oxo-2H-1,4-benzodiazepine-1-valeric acid as white prisms, M.P. 149–154°.

Method B.—A solution of 5.7 g. (0.0147 M) of 7-chloro-5-(2-fluorophenyl)-1,3-dihydro - 2 - oxo-2H-1,4-benzodiazepine-1-valeric acid in 100 ml. of acetic acid was treated with 25 ml. of water and 0.4 g. of platinum oxide. The mixture was hydrogenated at atmospheric pressure until the theoretical amount of hydrogen had been absorbed. The catalyst was removed by filtration through celite. The solution was made basic with ammonium hydroxide, acidified with acetic acid and the oil obtained was recovered by decanting the supernatant liquid. The oil was next dissolved in 50 ml. of dichloromethane, washed with 50 ml. of water, dried over anhydrous sodium sulfate and evaporated to dryness. The residue was crystallized and recrystallized from methanol, to give 7-chloro-5-(2-fluorophenyl)-1,3,4,5 - tetrahydro - 2 - oxo-2H-1,4-benzodiazepine-1-valeric acid as white prisms, M.P. and mmp. with a sample prepared as in Method A above, 149–155°.

EXAMPLE 15

Preparation of 7-chloro-5-(2-fluorophenyl)-4-methyl-1,3,4,5-tetrahydro-2-oxo-1,4-benzodiazepine-1-valeric acid A solution of 4.7 g. (0.01 M) of 7-chloro-5-(2-fluorophenyl)-4-methyl - 1,3,4,5 - tetrahydro - 2 - oxo - 2H - 1,4-benzodiazepine-1-valeric acid ethyl ester hydrochloride in 60 ml. of methanol was treated with 25 ml. (0.025 M) of 1 N sodium hydroxide with stirring, and then 70 ml. of water was added. The reaction mixture was stirred at room temperature for 20 hours. After first acidifying with 3 N hydrochloric acid, the solution was made basic with ammonia and methanol was removed under vacuum. The solution was extracted with dichloromethane (50 ml.), and the aqueous layer was acidified with acetic acid. The precipitate was recovered by filtration, washed with water and recrystallized from methanol to give 7-chloro-5-(2-fluorophenyl)-4-methyl - 1,3,4,5 - tetrahydro - 2 - oxo-2H-1,4-benzodiazepine-1-valeric acid as white prisms, M.P. 167–174°.

The starting material used above may be prepared as follows: To 9.6 g. (0.0229 M) of 7-chloro-5-(2-fluorophenyl)-1,3,4,5-tetrahydro - 2 - oxo - 2H - 1,4-benzodiazepine-1-valeric acid ethyl ester in 100 ml. of N,N-dimethylformamide was treated with 3.9 g. (0.0274 M) of methyl iodide. The reaction was heated at 45° for 2 hours when an additional 2 g. (0.014 M) of methyl iodide was added. The reaction mixture was then maintained at 55° for 4 hours. Solvent was removed under vacuum, and the residue was dissolved in 75 ml. of dichloromethane. The solution was washed with 50 ml. of dilute ammonium hydroxide, 50 ml. of saturated brine, dried over anhydrous sodium sulfate and evaporated to dryness. The residue was dissolved in 25 ml. of ethanol and 10 ml. (0.084 M) of 8.4 N ethanolic hydrogen chloride was added. The solution of the salt was evaporated to dryness and the product crystallized from a mixture of ethanol and ether to give 7-chloro-5-(2 - fluorophenyl) - 4 - methyl-1,3,4,5-tetrahydro-2-oxo-2H-1,4-benzodiazepine-1-valeric acid ethyl ester as white prisms, M.P. 158–167° (sealed tube).

EXAMPLE 16

A solution of 10 g. (0.037 M) of 7-chloro-1,3-dihydro-5-phenyl-2H-1,4-benzodiazepin-2-one in 70 ml. N,N-dimethylformamide is combined with a solution of 1.03 g. (0.045 M) of sodium in 10 ml. of methanol at a temperature of 0–5°. The solution is stirred for 15 minutes at room temperature, cooled to 5–10°, and then 9.5 (0.053 M) of α-bromo-crotonic acid-methyl ester is added and the temperature maintained at room temperature. After lowering the pressure, the resulting solution is divided between water and methylene chloride, the organic phase is washed with a saturated solution of sodium chloride, dried over sodium sulfate and evaporated. The remaining oil is chromatographed with benzene/aluminum oxide (150 g. neutral). The homogenous fractions are combined, compressed and crystallized from ether. Recrystallization from methanol yields 7-chloro-2,3-dihydro-2-oxo-5-phenyl - 1H - 1,4 - benzodiazepin-1-crotonic acid methylester, M.P. 125–127°.

In analogy to the procedures described in Example 2, the above-obtained product may be hydrolyzed to obtain 7-chloro-2,3-dihydro-2-oxo - 5 - phenyl - 1H - 1,4-benzodiazepin-1-crotonic acid.

EXAMPLE 17

In analogy to the procedures in Example 16, 10 g. of 7-chloro-1,3-dihydro-5-phenyl-2H-1,4-benzodiazepin-2-one is treated with 11.7 g. of α-bromocrotonic acid-tertiary butyl ester, chromatographed with benzene and aluminum oxide (neutral) to yield 7-chloro-2,3-dihydro-2-oxo-5-phenyl - 1H - 1,4 - benzodiazepin-1-crotonic acid-tertiary butylester, which after recrystallization from acetonitrile melts at 164–166°.

In analogy to the procedures described in Example 2, the above obtained product may be hydrolyzed to obtain 7 - chloro-2,3-dihydro-2-oxo-5-phenyl-1H-1,4-benzodiazepin-1-crotonic acid.

EXAMPLE 18

A solution of 10 g. of 7-chloro-2,3-dihydro-2-oxo-5-phenyl-1H-1,4-benzodiazepin-1-crotonic acid-tertiary butylester prepared as described in Example 17 in 350 ml. xylene is combined with 4.6 g. of p-toluene sulfonic acid monohydrate and allowed to reflux for one hour. After cooling, the yellow precipitate is filtered by suction, washed in ether, dissolved in 400 ml. of hot methanol and after addition of 800 ml. of ether is cooled in an ice bath to yield 7-chloro-2,3-dihydro-2-oxo-5-phenyl-1H-1,4-benzodiazepin-1-crotonic acid-p-toluene sulfonate with M.P. 268–270° (dec.).

The above-obtained product may be converted to the free acid form by dissolving it in dilute NaOH, washing the solution with methylene chloride, making the solution slightly acidic with HCl and extracting with dichloro methane. The extract is washed and evaporated to give 7 - chloro-2,3-dihydro-2-oxo-5-phenyl-1H-1,4-benzodiazepin-1-crotonic acid.

EXAMPLE 19

The pharmacological activity of a series of compounds of the present invention was determined in standard screening tests. Compounds of the present invention employed in these experiments were as follows:

3-[7-chloro-5-(2-fluorophenyl)-1,3-dihydro-2-oxo-2H-1,4-benzodiazepin-1-yl]propionic acid (Compound A)

7-chloro-5-(2-fluorophenyl)-1,3-dihydro-2-oxo-2H-1,4-benzodiazepine-1-butyric acid (Compound B)

7-chloro-5-(2-fluorophenyl)-2,3-dihydro-2-oxo-1H-1,4-benzodiazepine-1-valeric acid (Compound C)

7-nitro-5-phenyl-1,3-dihydro-2-oxo-2H-1,4-benzodiazepine-1-propionic acid (Compound D)

5-(2-chlorophenyl)-7-nitro-1,3-dihydro-2-oxo-2H-1,4-benzodiazepine-1-propionic acid (Compound E)

5-(2-fluorophenyl)-7-nitro-1,3-dihydro-2-oxo-2H-1,4-benzodiazepine-1-propionic acid (Compound F)

7-bromo-5-(2-pyridyl)-2,3-dihydro-2-oxo-1H-1,4-benzodiazepine-1-propionic acid (Compound G)

For the purposes of demonstrating the critical nature of the selection of the value of the alkyl group's carbon chain length within the range defining the compounds of the present invention, e.g. 2–10, a further comparison was run in this experiment utilizing a compound where the alkyl group carbon chain was 1. This compound is 2 - [7 - chloro-5-(2-fluorophenyl)-1,3-dihydro-2-one-1,4-benzodiazepin-1-yl]acetic acid and is designated Compound H in the following tests. This compound has a representative configuration with respect to substituents as the compounds of the present invention employed in the tests.

The tests employed in this experiment were the following:

Inclined screen

The test is useful in determining muscle relaxant activity. Groups of 6 male mice are given the test drug (maximum dose of 500 mg./kg.) and then are left on the inclined screen at least four hours for observation of paralyzing effects severe enough to cause them to slide off the screen. This activity is observed, additional doses are tested until at least two are reached at which some, but not all, the animals slide off the screen. Doses at which mice fall off the screen due to toxicity or excitation are not included in the calculation of $PD_{50}$. The $PD_{50}$ is determined from a graph on which dose is plotted against percent of mice paralyzed. This $PD_{50}$ value is defined as the dose in mg./kg. which can be expected to cause 50 percent of the mice to slide off the screen.

Foot shock

This test is a screen for compounds having muscle relaxant activity. A pair of mice is confined under a 1 liter beaker placed on a grid which presents shock to the feet. At least five fighting episodes are elicited in a 2-minute period. Pairs of mice are marked and pre-treated by oral dosage one hour prior to a second shocking. Logarithmic-dose intervals are utilized up to a maximum of 100 mg./kgm. At the 100 percent blocking dose, three out of three pairs must be blocked from fighting.

Unanaesthetized cat

Cats are treated orally and observed for minimum symptoms—usually ataxia. One cat is used at a dose of 50 mgm./kgm. If activity is present, up to three cats/dose are used. Results are given as minimum effective dose. This test is useful in determining muscle relaxant activity.

Antimetrazole

This test determines anticonvulsant activity of compounds in mice. The test compound is administered orally to groups of four mice at various dose levels. One hour later, metrazole (at a dose level previously determined to be sufficient to induce convulsive seizures in all test animals ~125 mg./kg.) is administered subcutaneously and the animals are observed for protection from convulsive seizures. Results are recorded as the number of animals protected against convulsions. The dose at which 50 percent of the animals are protected from convulsive seizures is expressed as the $ED_{50}$.

Maximum shock

When 30 ma. of current is delivered to mice for 0.2 second through corneal electrodes, a maximal tonic-clonic seizure is induced. The components of the maximal seizure in mice are: the hind leg flexor component of the tonic phase and a phase of body clonus. Mice are screened twenty-four hours prior to an assay to make sure that they respond normally. In the general screen, a compound is administered orally to groups with four mice at various dose levels. One hour after administration of drug, the 30 ma. shock is applied. This appearance of the hind leg extensor component is the criterion of activity. When activity is observed, the compound is administered to additional groups until the extensor phase reappears. The dose in mg./kg. which prevents hind limb extension in two of four animals is reported as the effective dose ($ED_{50}$). On active compounds, eight animals are employed per dose group.

Minimum shock

Seizures are induced by the application of a current to the eyes of the mice through corneal electrodes. A drop of physiological salt solution is placed on each eye of the mouse and the eyes are brought into direct contact with the electrodes. All mice are initially shocked at 6.0 ma. for 0.2 second. Only those animals which have a minimal seizure are utilized in an assay. After a twenty-four hour period has elapsed, the compound to be assayed is administered to groups of four animals at various dose levels. Following a 1-hour interval, the animals are again shocked at 6.0 ma. The criterion of activity is protection against a minimal seizure induced with this intensity of current. $ED_{50}$ values are determined for active compounds using eight animals per dose group.

The test results from the above test using indicated compounds including those of the present invention are summarized below in Table I.

TABLE I

| Compound: | Inclined screen, $PD_{50}$, mg./kg. | Foot shock 100 percent blocking dose level, mg./kg. | Unanaesthetized cat, MED, mg./kg. | Antimetrazole, $ED_{50}$, mg./kg. | Maximum shock, $ED_{50}$, mg./kg. | Minimum shock, $ED_{50}$, mg./kg. |
|---|---|---|---|---|---|---|
| A | 30 | 40 | 4 | 6.74 | 137 | >800 |
| B | 40 | 20 | 1 | 4 | 91 | >800 |
| C | 20 | 10 | | 5 | 186 | >800 |
| D | 200 | >100 | | 102 | 800 | >800 |
| E | 40 | 10 | >5 | 1.4 | >800 | >800 |
| F | 100 | 40 | 20 | 6.3 | 290 | >800 |
| G | 350 | >100 | | 50 | 345 | |
| H | 400 | >100 | | 455 | 800 | >800 |

The comparison of results between Compound H and the correspondingly substituted Compounds A, B and C indicates that superior activity is exhibited for the latter group of compounds where the alkyl group carbon chain is greater than 1, i.e., 2, 3 and 4, respectively. This is quite an unexpected result in view of the state of the benzodiazepine art where it has previously been observed that the activity due to a substituent is decreased as the length of the alkylene chain bearing the substituent is increased.

EXAMPLE 20

A representative formulation solution for parenteral use is as follows:

|  | Mg. |
|---|---|
| 7-chloro-5-(3-fluorophenyl)-2,3-dihydro-2-oxo-2H-1,4-bendodiazepine-1-butyric acid | 51 |
| Diethanolamine | 21 |
| Benzyl alcohol | 10 |
| Water for injection, q.s. | |

The above solution had a pH of about 8.9. On storage at one month at 55° C., this solution exhibited about 3 percent decomposition which demonstrates a useful stability in terms of a reasonable shelf life.

What is claimed is:

1. A compound selected from the group consisting of a compound of the formula

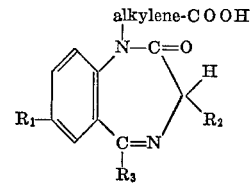

a compound of the formula

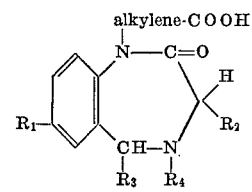

wherein the alkylene group in the 1-position has from 2 to 10 carbon atoms; $R_1$ is selected from the group consisting of hydrogen, halogen, trifluoromethyl, nitro, lower alkyl and amino; $R_2$ is selected from the group consisting of hydrogen, lower alkyl, hydroxy and lower alkanoyloxy; $R_3$ is selected from the group consisting of pyridyl, phenyl, or phenyl substituted with halogen, trifluoromethyl, nitro, lower alkyl or amino; and $R_4$ is selected from the group consisting of hydrogen and lower alkyl and the pharmaceutically acceptable salts thereof.

2. A compound of claim 1 wherein $R_1$ is halogen; $R_2$ is hydrogen; and $R_3$ is phenyl or phenyl substituted with halogen.

3. The compound of claim 2 wherein said alkylene group has 2 carbon atoms; $R_1$ is chlorine; $R_2$ is hydrogen and $R_3$ is 2-fluorophenyl, that is, 3-[7-chloro-5-(2-fluorophenyl) - 1,3 - dihydro-2-oxo - 2H - 1,4 - benzodiazepin-1-yl]propionic acid.

4. The compound of claim 2 wherein said alkylene group has 3 carbon atoms; $R_1$ is chlorine; $R_2$ is hydrogen and $R_3$ is 2-fluorophenyl, that is 7-chloro-5-(2-fluorophenyl) - 1,3 - dihydro - 2 - oxo-2H-1,4-benzodiazepine-1-butyric acid.

5. The compound of claim 2 wherein said alkylene group has 4 carbon atoms; $R_1$ is chlorine; $R_2$ is hydrogen and $R_3$ is 2-fluorophenyl, that is, 7-chloro-5-(2-fluorophenyl)-2,3-dihydro - 2 - oxo-2H - 1,4 - benzodiazepine-1-valeric acid.

6. The compound of claim 2 wherein said alkylene group has 9 carbon atoms; $R_1$ is chlorine; $R_2$ is hydrogen and $R_3$ is 2-fluorophenyl, that is, 7-chloro-5-(2-fluorophenyl)-1,3 - dihydro - 2-oxo-2H-1,4-benzodiazepine-1-decanoic acid.

7. The compound of claim 2 wherein said alkylene group has 5 carbon atoms; $R_1$ is chlorine; $R_2$ is hydrogen and $R_3$ is phenyl, that is, 7-chloro-2,3-dihydro-$\alpha,\alpha$-dimethyl - 2 - oxo-5-phenyl-1H-1,4-benzodiazepine-1-butyric acid.

8. The compound of claim 2 wherein said alkylene group has 3 carbon atoms; $R_1$ is iodo; and $R_3$ is 2-fluorophenyl, that is, 5-(2-fluorophenyl)-1,3-dihydro-7-iodo-2-oxo-2H-1,4-benzodiazepine-1-butyric acid.

9. The compound of claim 2 wherein said alkylene group has 4 carbon atoms; $R_1$ is iodo and $R_3$ is 2-fluorophenyl, that is, 5-(2-fluorophenyl)-1,3-dihydro-7-iodo-2-oxo-2H-1,4-benzodiazepine-1-valeric acid.

10. A compound of claim 1 wherein $R_1$ is nitro; $R_2$ is hydrogen; and $R_3$ is phenyl or phenyl substituted with halogen.

11. The compound of claim 10 wherein said alkylene group has 2 carbon atoms; and $R_3$ is 2-chlorophenyl, that is, 5-(2-chlorophenyl)-7-nitro - 1,3-dihydro-2-oxo-2H-1,4-benzodiazepine-1-propionic acid.

12. The compound of claim 10 wherein said alkylene group has 2 carbon atoms; and $R_3$ is 2-fluorophenyl, that is, 5-(2-fluorophenyl) - 7-nitro-1,3-dihydro-2-oxo-2H-1,4-benzodiazepine-1-propionic acid.

13. The compound of claim 10 wherein said alkylene group has 2 carbon atoms; and $R_3$ is phenyl, that is, 7-nitro - 5 - phenyl-1,3-dihydro-2-oxo-2H-1,4-benzodiazepine-1-propionic acid.

14. A compound of claim 1 wherein $R_1$ is halogen; $R_2$ is hydrogen; and $R_3$ is pyridyl.

15. The compound of claim 14 wherein said alkylene group has 2 carbon atoms; and $R_1$ is bromo, that is, 7-bromo-5-(2 - pyridyl)-2,3 - dihydro-2-oxo-1H-1,4-benzodiazepine-1-propionic acid.

16. A compound of the formula

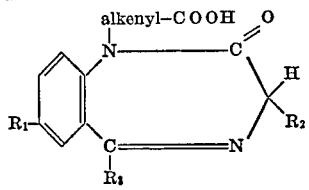

a compound of the formula

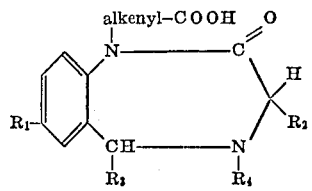

wherein the alkenyl group in the 1-position has from 2 to 10 carbon atoms; $R_1$ is selected from the group consisting of hydrogen, halogen, trifluoromethyl, nitro, lower alkyl and amino; $R_2$ is selected from the group consisting of hydrogen, lower alkyl, hydroxy and lower alkanoyloxy; $R_3$ is selected from the group consisting of pyridyl, phenyl, or phenyl substituted with halogen, trifluoromethyl nitro, lower alkyl or amino; and $R_4$ is selected from the group consisting of hydrogen and lower alkyl and the pharmaceutically acceptable salts thereof.

17. The compound of claim 16 wherein the alkenyl group contains 3 carbon atoms; $R_1$ is chloro; and $R_3$ is phenyl, that is, 7-chloro-2,3-dihydro-2-oxo-5-phenyl-1H-1,4-benzodiazepin-1-crotonic acid.

18. A compound of claim 16 wherein $R_1$ is halogen; $R_2$ is hydrogen and $R_3$ is phenyl or mono-halo phenyl.

References Cited

UNITED STATES PATENTS 3,236,838   2/1966   Archer et al. _____ 260—239.3

OTHER REFERENCES

Noller, "Chemistry of Organic Compounds," 2nd ed. (Saunders) (1957), pp. 170–171.

HENRY R. JILES, Primary Examiner

R. T. BOND, Assistant Examiner

U.S. Cl. X.R.

424—244, 263